US012142190B1

(12) United States Patent
Lin et al.

(10) Patent No.: US 12,142,190 B1
(45) Date of Patent: Nov. 12, 2024

(54) DISPLAY CONTROL SYSTEM FOR SPLICING SCREEN

(71) Applicant: NOVATEK Microelectronics Corp., Hsin-Chu (TW)

(72) Inventors: Chieh-An Lin, Taipei (TW); Chun-Wei Kang, Hsinchu (TW); Po-Hsiang Fang, Hsinchu County (TW); Keko-Chun Liang, Hsinchu (TW); Jhih-Siou Cheng, New Taipei (TW); Nien-Tsung Hsueh, Hsinchu County (TW); Che-Wei Yeh, Hsinchu (TW); Yu-Hsiang Wang, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/522,263

(22) Filed: Nov. 29, 2023

(51) Int. Cl.
*G09G 3/32* (2016.01)
*G09G 3/20* (2006.01)

(52) U.S. Cl.
CPC ............. *G09G 3/2096* (2013.01); *G09G 3/32* (2013.01); *G09G 2300/026* (2013.01); *G09G 2320/0233* (2013.01); *G09G 2330/021* (2013.01); *G09G 2360/06* (2013.01); *G09G 2370/00* (2013.01)

(58) Field of Classification Search
CPC ..... G09G 2320/0233; G09G 2300/026; G09G 3/32; G09G 2360/06
See application file for complete search history.

(56) References Cited

U.S. PATENT DOCUMENTS

| | | | | |
|---|---|---|---|---|
| 2016/0335948 | A1* | 11/2016 | Wen | G09G 5/06 |
| 2023/0085621 | A1* | 3/2023 | Mohtashemi | G09G 3/2092 345/51 |

* cited by examiner

*Primary Examiner* — Abbas I Abdulselam
(74) *Attorney, Agent, or Firm* — Winston Hsu

(57) ABSTRACT

A display control system for controlling a display panel having a plurality of display zones includes a main controller, a plurality of display driver circuits and a plurality of memories. Each of the display driver circuits is coupled to a corresponding display zone among the plurality of display zones, to control the corresponding display zone. Each of the memories is coupled to a corresponding display driver circuit among the plurality of display driver circuits, to store a compensation data for the corresponding display zone controlled by the corresponding display driver circuit. The plurality of display driver circuits are cascaded through a plurality of first transmission channels and connected through at least one second transmission channel, and each of the first transmission channels is coupled between two of the plurality of display driver circuits or between one of the plurality of display driver circuits and the main controller.

22 Claims, 10 Drawing Sheets

DISPLAY CONTROL SYSTEM FOR SPLICING SCREEN

BACKGROUND OF THE INVENTION

1. Field of the Invention

The present invention relates to a display control system, and more particularly, to a display control system for a splicing screen.

2. Description of the Prior Art

Nowadays, a splicing screen is widely applied to realize a large-scale display screen. The splicing screen, which may be implemented with the liquid crystal display (LCD) or light-emitting diode (LED) display technology, is able to broadcast information to crowds of people simultaneously. For example, a digital signage may be realized by using an LED splicing screen set up in a crowded place, to show various information such as advertisements, movies or traffic information to people.

After long-term usage of the splicing screen, the aging of the LEDs on the screen may cause brightness non-uniformity and therefore degrade the quality of display images. Therefore, it is necessary to calibrate or compensate for the brightness characteristics of the LEDs pixel by pixel.

SUMMARY OF THE INVENTION

It is therefore an objective of the present invention to provide a novel display control system for a splicing screen, in order to solve the abovementioned problems.

An embodiment of the present invention discloses a display control system for controlling a display panel. The display panel has a plurality of display zones. The display control system comprises a main controller, a plurality of display driver circuits and a plurality of memories. Each of the plurality of display driver circuits is coupled to a corresponding display zone among the plurality of display zones, to control the corresponding display zone. Each of a plurality of memories is coupled to a corresponding display driver circuit among the plurality of display driver circuits, to store a compensation data for the corresponding display zone controlled by the corresponding display driver circuit. Wherein, the plurality of display driver circuits are cascaded through a plurality of first transmission channels and connected through at least one second transmission channel, and each of the plurality of first transmission channels is coupled between two of the plurality of display driver circuits or between one of the plurality of display driver circuits and the main controller.

Another embodiment of the present invention discloses a display control system for controlling a display panel. The display panel has a plurality of display zones. The display control system comprises a main controller, a plurality of sub-controllers, a plurality of display driver circuits and a plurality of memories. The plurality of sub-controllers are coupled to the main controller, wherein each of the plurality of sub-controllers is to control a corresponding display zone among the plurality of display zones. Each of the plurality of display driver circuits is coupled to one of the plurality of sub-controllers and one of the plurality of display zones controlled by the corresponding sub-controller. Each of the plurality of memories is coupled to a corresponding sub-controller among the plurality of sub-controllers, to store a compensation data for one of the plurality of display zones controlled by the corresponding sub-controller. Wherein, the plurality of sub-controllers are cascaded through a plurality of first transmission channels, and a first sub-controller among the plurality of sub-controllers is coupled to a plurality of first display driver circuits among the plurality of display driver circuits through a second transmission channel and a third transmission channel.

Another embodiment of the present invention discloses a display control system for controlling a display panel. The display panel has a plurality of display zones. The display control system comprises a main controller, a plurality of display driver circuits and a plurality of memories. Each of the plurality of display driver circuits is coupled to a corresponding display zone among the plurality of display zones, to control the corresponding display zone. Each of the plurality of memories is coupled to a corresponding display driver circuit among the plurality of display driver circuits, to store a compensation data for the corresponding display zone controlled by the corresponding display driver circuit. Wherein, the plurality of display driver circuits are cascaded through a plurality of transmission channels, and each of the plurality of transmission channels is coupled between two of the plurality of display driver circuits or between one of the plurality of display driver circuits and the main controller.

These and other objectives of the present invention will no doubt become obvious to those of ordinary skill in the art after reading the following detailed description of the preferred embodiment that is illustrated in the various figures and drawings.

DETAILED DESCRIPTION

The splicing screen is usually composed of a plurality of light boards, each having a display zone, a data splitter, and/or one or more drivers and controllers. The driver(s) and controller(s) may be used to drive and control the display zone to show the desired image. The data splitter, which may be implemented in each light board or implemented in the video source delivering the video data, is configured to divide and allocate the video data to be shown in each fragment of the splicing screen.

Figure 1:
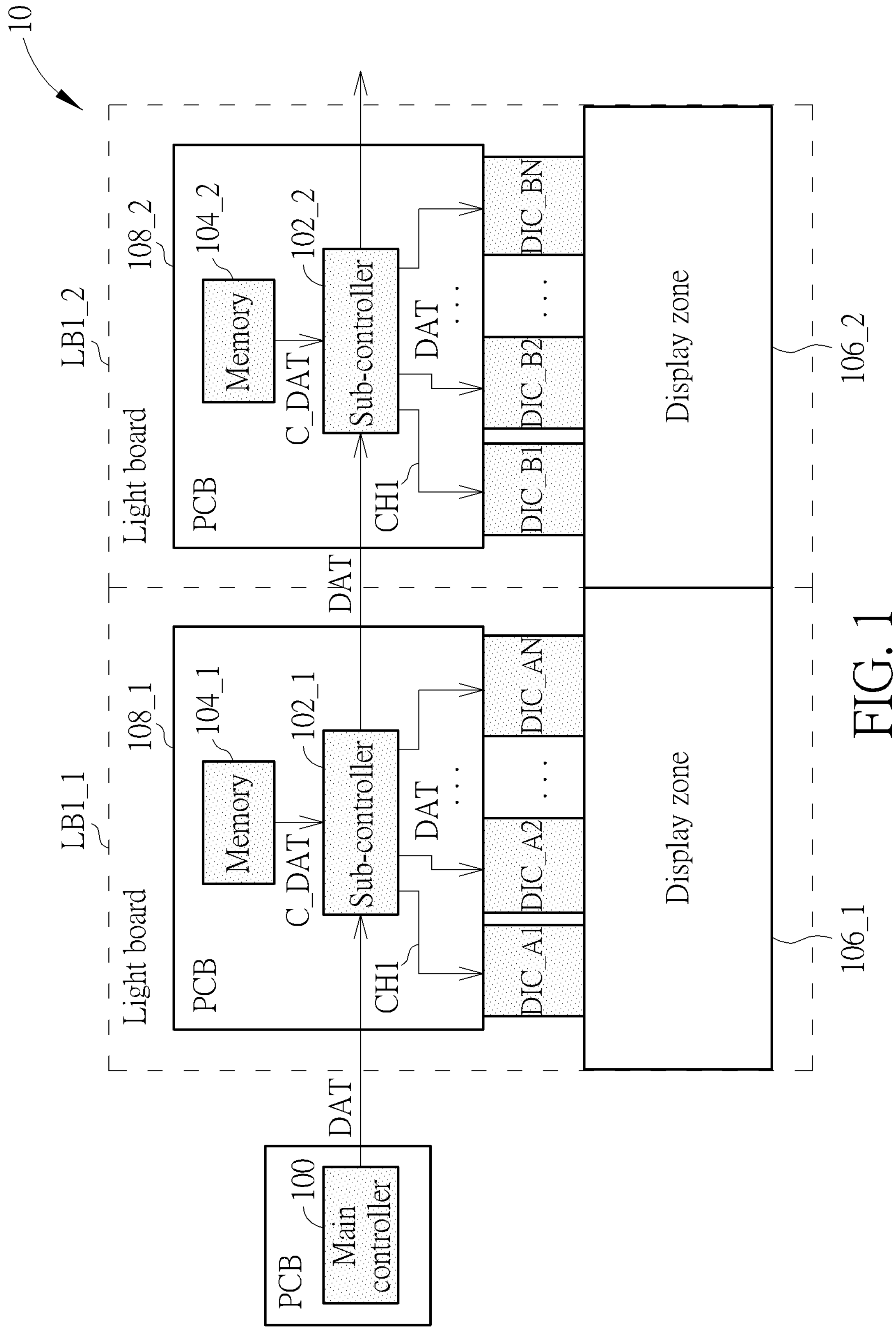
FIG. 1 is a schematic diagram of a display control system for controlling the splicing screen.

FIG. 1 is a schematic diagram of a display control system 10 for controlling the splicing screen. The display control system 10 includes a main controller 100 and a plurality of light boards LB1_1, LB1_2 . . . . Each light board LB1_1, LB1_2 may include a display zone 106_1, 106_2 and a control circuitry 108_1, 108_2 implemented on a circuit board, which may be, but not limited to, a printed circuit board (PCB). Each display zone 106_1, 106_2 may include a plurality of light emitting devices arranged as an array, where each light emitting device may be a light emitting diode (LED) or an organic LED (OLED), but not limited thereto. Each of the light boards may be a segment of a splicing screen of a display panel such as a LED panel, mini-LED panel, micro-LED panel, ultra-LED panel or OLED panel. For example, the splicing screen of a display panel such as a large-scale outdoor or indoor digital signage may be constructed by combining the display zones of a great number of light boards.

The display control system 10 may include a great number of connected light boards, and only two light boards LB1_1 and LB1_2 are shown in FIG. 1 for brevity. The light boards LB1_1 and LB1_2 are controlled by the main controller 100. In detail, the main controller 100, which may be implemented on a PCB, may serve as a video source for outputting display data DAT to the light boards LB1_1 and LB1_2. In an embodiment, the main controller 100 may be a sending card, which is capable of generating and outputting the display data DAT in a format receivable by the light boards LB1_1 and LB1_2.

Each of the light boards LB1_1 and LB1_2 may include a sub-controller 102_1, 102_2, a memory 104_1, 104_2, and a plurality of display driver circuits DIC_A1-DIC_AN, DIC_B1-DIC_BN. The sub-controllers 102_1 and 102_2 of different light boards are connected in cascade, from the main controller 100 to the sub-controller (e.g., 102_2) of the last light board. The main controller 100 may send the display data DAT of the entire image frame to the cascaded sub-controllers 102_1 and 102_2. More specifically, under the cascade structure, the main controller 100 outputs the display data DAT to the sub-controller 102_1 of the first light board LB1_1, the sub-controller 102_1 of the first light board LB1_1 may deliver the display data DAT to the sub-controller 102_2 of the second light board LB1_2, the sub-controller 102_2 of the second light board LB1_2 may deliver the display data DAT to the sub-controller of the third light board, and so on. The sub-controller 102_1, 102_2 of each light board LB1_1, LB1_2 may analyze the commands or parameters associated with the display data DAT, to recognize the display data DAT for itself. Therefore, each sub-controller 102_1, 102_2 may extract the display data DAT of the corresponding display zone 106_1, 106_2 and output the display data DAT to the corresponding display driver circuits DIC_A1-DIC_AN, DIC_B1-DIC_BN. If the display data DAT is not for the display zone 106_1, 106_2 controlled by the sub-controller 102_1, 102_2, it may deliver the display data DAT to subsequent light boards and their sub-controllers.

The memory 104_1, 104_2 may store the compensation data C_DAT for the display zone 106_1, 106_2 controlled by the corresponding sub-controller 102_1, 102_2. The compensation data C_DAT may include, but not limited to, demura data. In an embodiment, the memory 104_1, 104_2 may be a flash memory, but not limited thereto.

Each of the display driver circuits DIC_A1-DIC_AN and DIC_B1-DIC_BN, which is coupled between the sub-controller 102_1 or 102_2 and the corresponding display zone 106_1 or 106_2, is responsible for driving an area of the display zone 106_1 or 106_2. For example, the display zone 106_1 of the light board LB1_1 may be divided into 6 areas, and the light board LB1_1 may include 6 display driver circuits DIC_A1-DIC_A6 for controlling the 6 areas, respectively. As shown in FIG. 1, the sub-controller 102_1, 102_2 is coupled to each driver circuit DIC_A1-DIC_AN, DIC_B1-DIC_BN through a transmission channel CH1, for outputting the display data DAT of each area to the corresponding driver circuit DIC_A1-DIC_AN, DIC_B1-DIC_BN through the transmission channel CH1. The display driver circuits DIC_A1-DIC_AN, DIC_B1-DIC_BN may convert the display data DAT into data voltages and output the data voltages to the corresponding area of the display zone 106_1, 106_2. In an embodiment, each of the display driver circuits DIC_A1-DIC_AN and DIC_B1-DIC_BN may be implemented in an integrated circuit (IC) to realize a display driver IC (DDIC). The structures of the display driver circuit or DDIC are well known by one of ordinary skill in the art, and will not be detailed herein.

Figure 2:
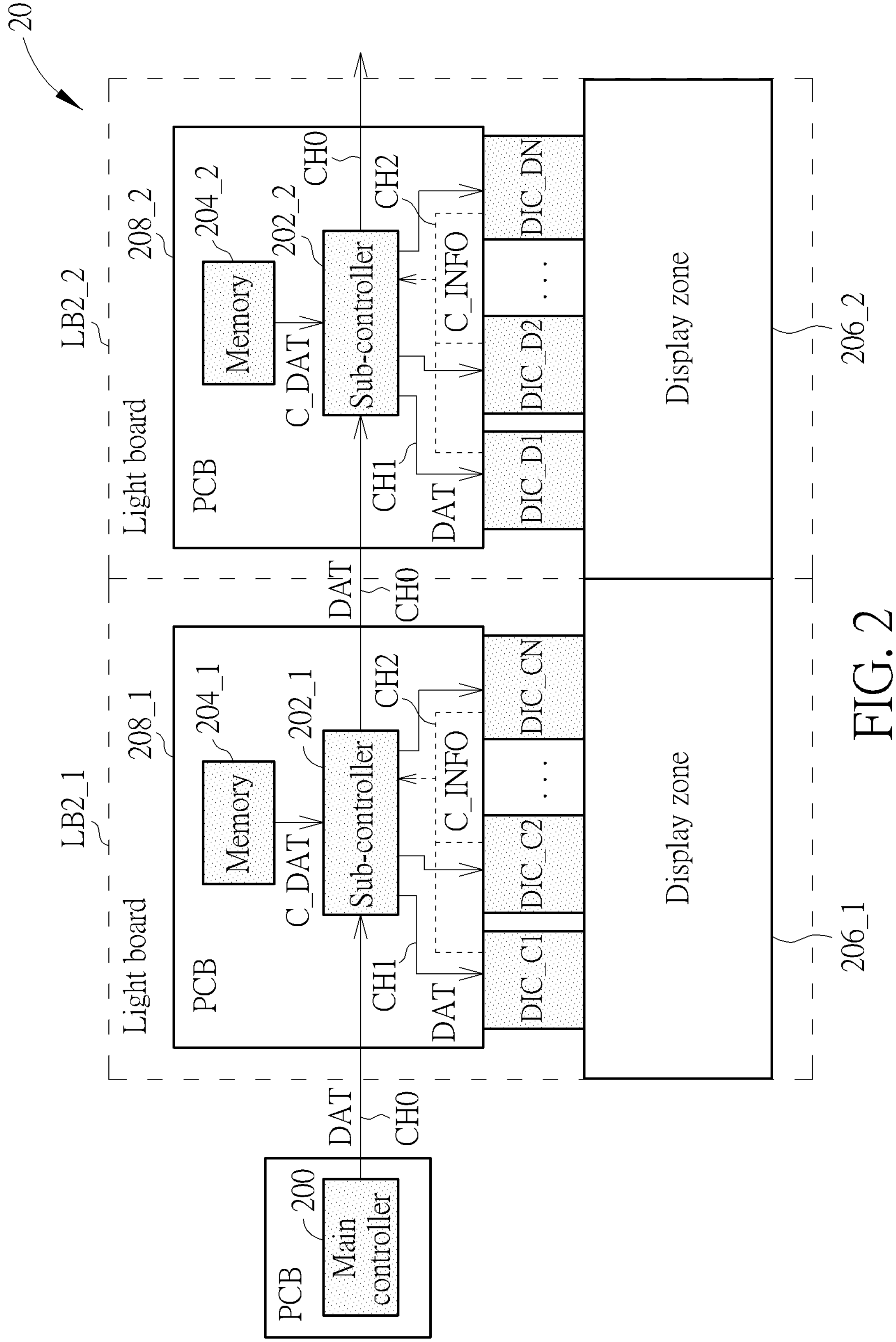
FIG. 2 is a schematic diagram of a display control system according to an embodiment of the present invention.

FIG. 2 is a schematic diagram of a display control system 20 according to an embodiment of the present invention. The display control system 20 also includes a main controller 200 and a plurality of light boards LB2_1, LB2_2. Each light board LB2_1, LB2_2 may form a display zone 206_1, 206_2, and include a sub-controller 202_1, 202_2, a memory 204_1, 204_2, and a plurality of display driver circuits DIC_C1-DIC_CN, DIC_D1-DIC_DN, which may be deployed on a PCB, as a control circuit 208_1, 208_2 of the circuit board.

Similarly, the sub-controller 202_1, 202_2 of each light board LB2_1, LB2_2 is connected in cascade, and the sub-controller 202_1 of the first light board LB2_1 is further connected to the main controller 200. The sub-controller 202_1 and 202_2 may control the corresponding display zone 206_1 and 206_2 and provide the display data DAT for the display zone 206_1 and 206_2. More specifically, as shown in FIG. 2, the sub-controllers 202_1 and 202_2 are cascaded through a plurality of transmission channels CH0; that is, each transmission channel CH0 may be coupled between two sub-controllers (e.g., 202_1 and 202_2) or coupled between the sub-controller 202_1 and the main controller 200. The transmission channels CH0 may forward the display data DAT to each of the sub-controllers 202_1 and 202_2.

The memory 204_1, 204_2 may store the compensation data C_DAT, such as the demura data, for the display zone 206_1, 206_2 controlled by the sub-controller 202_1, 202_2. For example, the product manufacturer may first measure each LED on the light board LB2_1 or LB2_2 to obtain its luminance efficiency before the splicing screen product of the display control system 20 starts to be used. Based on the luminance efficiency of each LED, the related demura data may be obtained. The demura data may compensate for the non-uniformity of the LEDs' luminance (also known as "Mura"), to make all the LEDs on the light boards LB2_1 and LB2_2 generate consistent luminance under the same data voltage.

The display driver circuits DIC_C1-DIC_CN, DIC_D1-DIC_DN may be coupled between the sub-controller 202_1, 202_2 and the corresponding display zone 206_1, 206_2. Different from the display control system 10 where the sub-controller 102_1 or 102_2 is coupled to each driver circuit DIC_A1-DIC_AN or DIC_B1-DIC_BN through only one transmission channel CH1, in the display control system 20 as shown in FIG. 2, the sub-controller 202_1, 202_2 may be coupled to each display driver circuit DIC_C1-DIC_CN, DIC_D1-DIC_DN through two transmission channels CH1 and CH2. The transmission channel CH1 may forward the display data DAT from the sub-controller 202_1, 202_2 to the corresponding display driver circuit DIC_C1-DIC_CN, DIC_D1-DIC_DN, and the transmission channel CH2 may forward compensation information C_INFO from the corresponding display driver circuit DIC_C1-DIC_CN, DIC_D1-DIC_DN to the sub-controller 202_1, 202_2. In an embodiment, the transmission channel CH2 may include a multi-drop interface; that is, the transmission channel CH2 may be a multi-drop bus having a plurality of terminals, where one terminal is connected to the sub-controller 202_1 or 202_2 and each of other terminals is connected to one of the display driver circuits DIC_C1-DIC_CN or DIC_D1-DIC_DN.

In an embodiment, the compensation information C_INFO delivered by the transmission channel CH2 may include demura information and/or abnormal information of the corresponding display zone 206_1 or 206_2. Each display driver circuit DIC_C1-DIC_CN or DIC_D1-DIC_DN is capable of detecting the status of LEDs in the responsible area, obtaining the related compensation information C_INFO, and forwarding the compensation information C_INFO to the sub-controller 202_1 or 202_2 through the transmission channel CH2.

The demura information is associated with the demura compensation of the display zone 206_1, 206_2. As mentioned above, the memory 204_1 and 204_2 may store the demura data to compensate for the luminance non-uniformity obtained before the product starts to be used. During the use of the product, each LED on the light boards LB2_1 and LB2_2 may still experience different degrees of aging, resulting in different degrees of luminance efficiency attenuation and/or threshold voltage variation. The attenuation and/or variation may further generate additional luminance non-uniformity, and the demura information associated with the luminance non-uniformity may be sent from the display driver circuit DIC_C1-DIC_CN, DIC_D1-DIC_DN to the sub-controller 202_1, 202_2 through the transmission channel CH2.

In addition, the abnormal information is associated with abnormal situations of the light boards LB2_1, LB2_2. For example, the display driver circuit DIC_C1-DIC_CN, DIC_D1-DIC_DN may detect that a data line and/or scan line is short-circuited or open-circuited abnormally, or detect that any of the LEDs has abnormal luminance characteristics. After detecting any abnormal situations, the display driver circuit DIC_C1-DIC_CN, DIC_D1-DIC_DN may forward the related abnormal information to the sub-controller 202_1, 202_2 through the transmission channel CH2.

Therefore, the sub-controller 202_1, 202_2 in each light board LB2_1, LB2_2 may collect the compensation information C_INFO received from the display driver circuits DIC_C1-DIC_CN, DIC_D1-DIC_DN, and forward the compensation information C_INFO to the front-end main controller 200, e.g., through the transmission channel CH0.

In the prior art, in order to deal with the LED aging and abnormal situations of the light boards, the product manufacturer should use a camera to capture the display image and make a diagnosis manually. If an abnormal light board on the splicing screen is found, it is requested to take down the light board for detailed inspection and repair. In comparison, the display control system of the present invention provides a feedback channel (i.e., the transmission channel CH2) for forwarding the compensation information that indicates the abnormal situation and Mura phenomenon to the main controller. In such a situation, a user may remotely diagnose and solve the problems of the splicing screen through the main controller. This solution is more effective and cost-saving.

Since the transmission channel CH2 is implemented with the multi-drop interface, where all the display driver circuits DIC_C1-DIC_CN or DIC_D1-DIC_DN share the same transmission bus, the display driver circuits DIC_C1-DIC_CN, DIC_D1-DIC_DN may output the compensation information C_INFO to the sub-controller 202_1, 202_2 time-divisionally.

Note that a splicing screen may include a great number of light boards, and each light board has a sub-controller which is coupled to several display driver circuits for controlling the corresponding display zone. Thus, there are a vast number of ICs included in the splicing screen, including a sub-controller and display driver circuits, and the sub-controller should possess a great number of connection ports to be connected to the display driver circuits. In order to save the circuit costs, it is requested to simplify the structure of the light boards. In an embodiment, the sub-controller in the light boards may be omitted to simplify the circuit structure and save the circuit cost.

Figure 3:
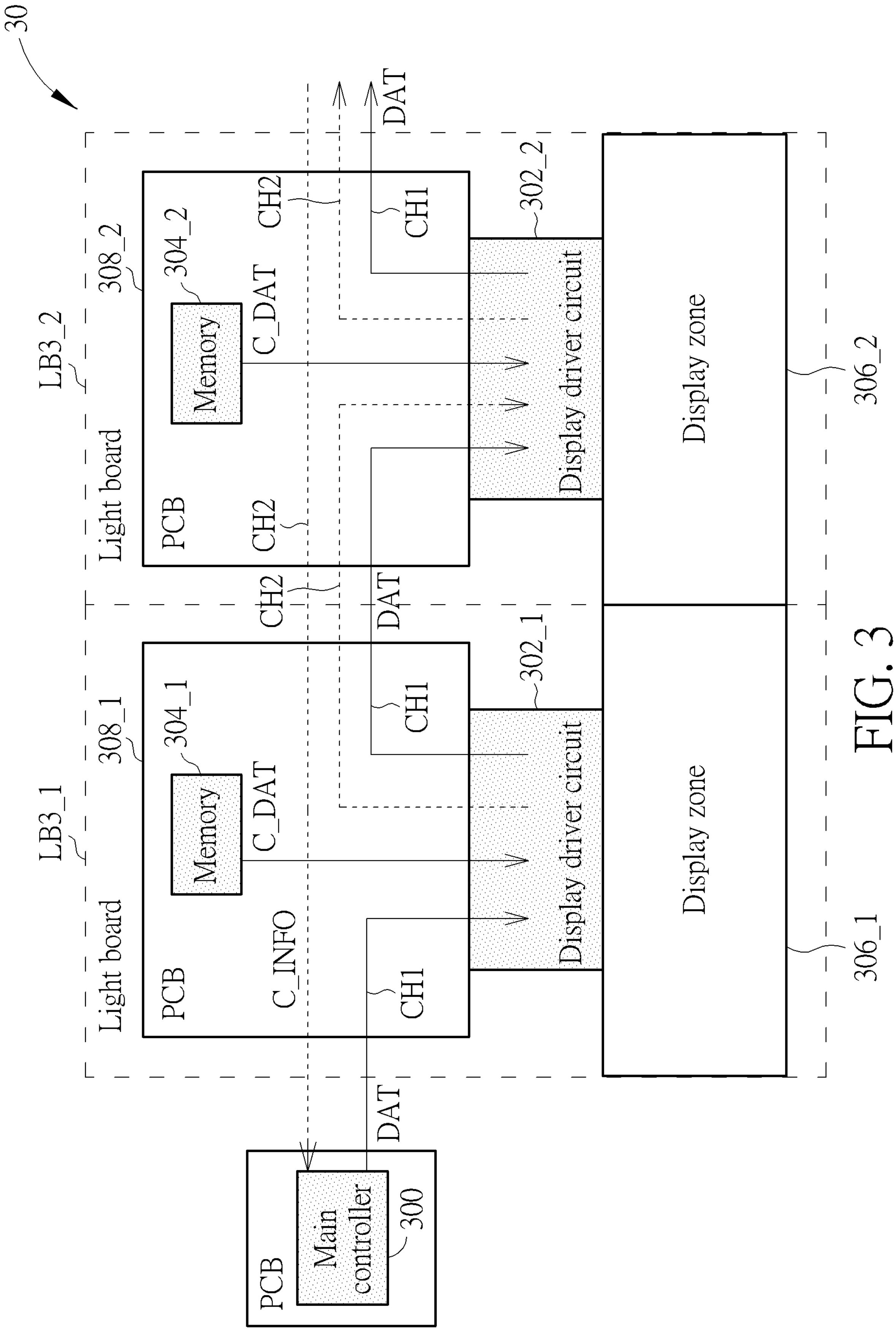
FIG. 3 is a schematic diagram of a display control system according to an embodiment of the present invention.

FIG. 3 is a schematic diagram of a display control system 30 according to an embodiment of the present invention. The display control system 30 includes a main controller 300 and a plurality of light boards LB3_1, LB3_2. Each of the light boards LB3_1, LB3_2 may form a display zone 306_1, 306_2, and include a display driver circuit 302_1, 302_2 and a memory 304_1, 304_2, which may be deployed on a PCB, as a control circuit 308_1, 308_2 of the circuit board. The operations of the main controller 300 are similar to those of the main controller 100 or 200, and will not be detailed herein. The operations of the memories 304_1 and 304_2 are also similar to those described above; that is, the memory 304_1, 304_2 may store the compensation data C_DAT for the corresponding display zone 306_1, 306_2.

In this embodiment, the display driver circuit 302_1 and 302_2 may realize the functions of the display driver circuits DIC_C1-DIC_CN and the sub-controller 202_1 and the display driver circuits DIC_D1-DIC_DN and the sub-controller 202_2 in the display control system 20, respectively, thereby saving the structure and cost in each light board LB3_1, LB3_2. For example, in the display control system 20, there may be 6 display driver circuits for outputting data voltages to 6 areas of a display zone, respectively. In comparison, in the display control system 30, the display driver circuit 302_1, 302_2 is capable of outputting data voltages to the entire display zone 306_1, 306_2, which is equivalent to 6 times the output data amount. This saves the number of ICs in each light board LB3_1, LB3_2, and also saves the complex wire connections between the sub-controller and a great number of display driver circuits.

In general, a large-scale splicing screen may usually include hundreds of light boards. Since each light board is provided with only one display driver circuit instead of a sub-controller and multiple display driver circuits, the overall number of ICs included in the display control system 30 for controlling the splicing screen may significantly be reduced. Correspondingly, the wire connections and input/output ports between different ICs may be reduced, thereby reducing the number of layers required to be implemented on the PCBs and saving power consumption. In such a situation, the structure simplification of the light boards LB3_1 and LB3_2 may achieve tremendous improvements on the splicing screen in various aspects.

As shown in FIG. 3, the display driver circuits 302_1 and 302_2 of different light boards LB3_1 and LB3_2 are connected in cascade through transmission channels CH1 and CH2. The transmission channels CH1 may forward the display data DAT, and the transmission channels CH2 may forward the compensation information C_INFO.

In detail, each transmission channel CH1 may be coupled between two of the display driver circuits (e.g., 302_1 and 302_2) or between the display driver circuit 302_1 and the main controller 300. The transmission channels CH1 may forward the display data DAT from the main controller 300 to the display driver circuit 302_1, 302_2 in each light board LB3_1, LB3_2. More specifically, the main controller 300 outputs the display data DAT to the display driver circuit 302_1 of the first light board LB3_1, the display driver circuit 302_1 of the first light board LB3_1 may deliver the display data DAT to the display driver circuit 302_2 of the second light board LB3_2, the display driver circuit 302_2 of the second light board LB3_2 may deliver the display data DAT to the display driver circuit of the third light board, and so on. In this embodiment, since the sub-controllers are omitted, the main controller 300 may transmit the display data DAT to each display driver circuit 302_1 and 302_2 without through a sub-controller. The display driver circuit 302_1, 302_2 may recognize whether the received display data DAT is for itself. Based on the recognition result, the display driver circuit 302_1, 302_2 may process the display data DAT and convert the display data DAT into the data voltages to be output to the corresponding display zone 306_1, 306_2 if the display data DAT is for itself, or forward the display data DAT to subsequent display driver circuits if the display data DAT is not for itself.

The transmission channel CH2 may forward the compensation information C_INFO from the corresponding display driver circuit 302_1, 302_2 to the main controller 300. More specifically, the display driver circuit 302_1 of the first light board LB3_1 may deliver the compensation information C_INFO to the display driver circuit 302_2 of the second light board LB3_2, the display driver circuit 302_2 of the second light board LB3_2 may deliver the compensation information C_INFO to the display driver circuit of the third light board, and so on. The display driver circuit of the last light board may collect the compensation information C_INFO of all the light boards and deliver all the compensation information to the main controller 300. Similarly, the display driver circuits 302_1 and 302_2 transmit the compensation information C_INFO to the main controller 300 without through a sub-controller. The compensation information C_INFO may include at least one of demura information and abnormal information, and the related implementations are similar to those described above, and will not be repeated herein.

In this embodiment, both the transmission channels CH1 and CH2 are implemented in cascade. In such a situation, each light board LB3_1, LB3_2 may only need to be wire-connected with its adjacent two light boards. Since the transmission channel CH2 for forwarding the compensation information does not use a multi-drop bus, the wire connections of the transmission channel CH2 might not intersect the wire connections of the transmission channel CH1, so as to reduce the layout complexity and save the number of layers on the PCB.

Figure 4:
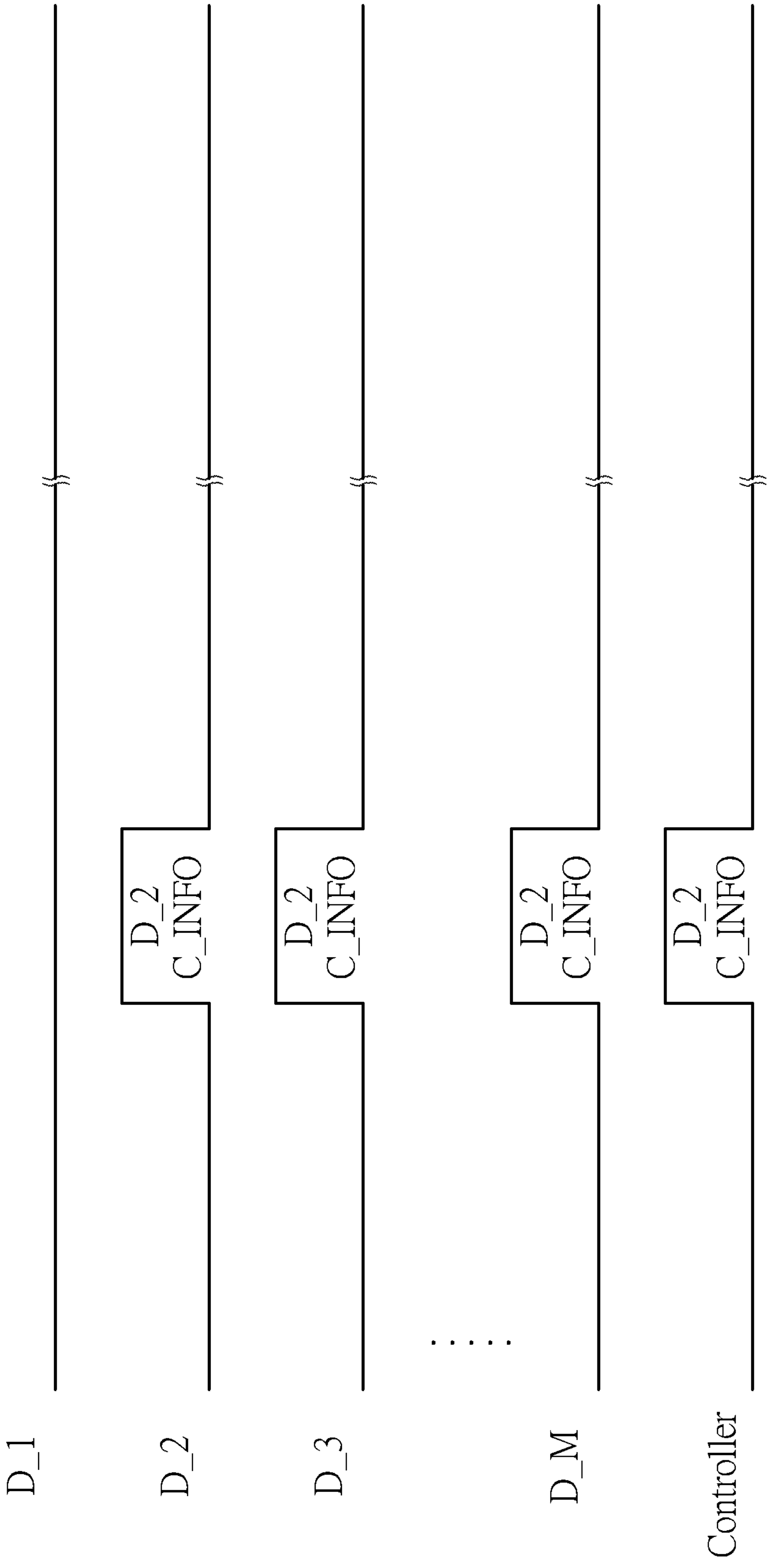
FIG. 4 illustrates a specific display driver circuit sends the compensation information to the main controller.

The compensation information C_INFO may be sent to the main controller 300 in any appropriate manner. In an embodiment, the compensation information C_INFO of a specific light board may be sent through the transmission channel CH2. For example, supposing that there are M light boards in a display control system, the display driver circuits D_1-D_M of the light boards may be cascaded through the transmission channels CH2 for delivering the compensation information C_INFO, and the display driver circuit D_M of the last light board may further be coupled to the main controller. FIG. 4 illustrates that a specific display driver circuit sends the compensation information C_INFO to the main controller. For example, the display driver circuit D_2 may find that there is an abnormal situation appearing on the corresponding display zone, and therefore send the abnormal information to the main controller. The compensation information C_INFO is output from the display driver circuit D_2 and then forwarded through the display driver circuits from D_3 to D_M, and finally reaches the main controller.

Figure 5:
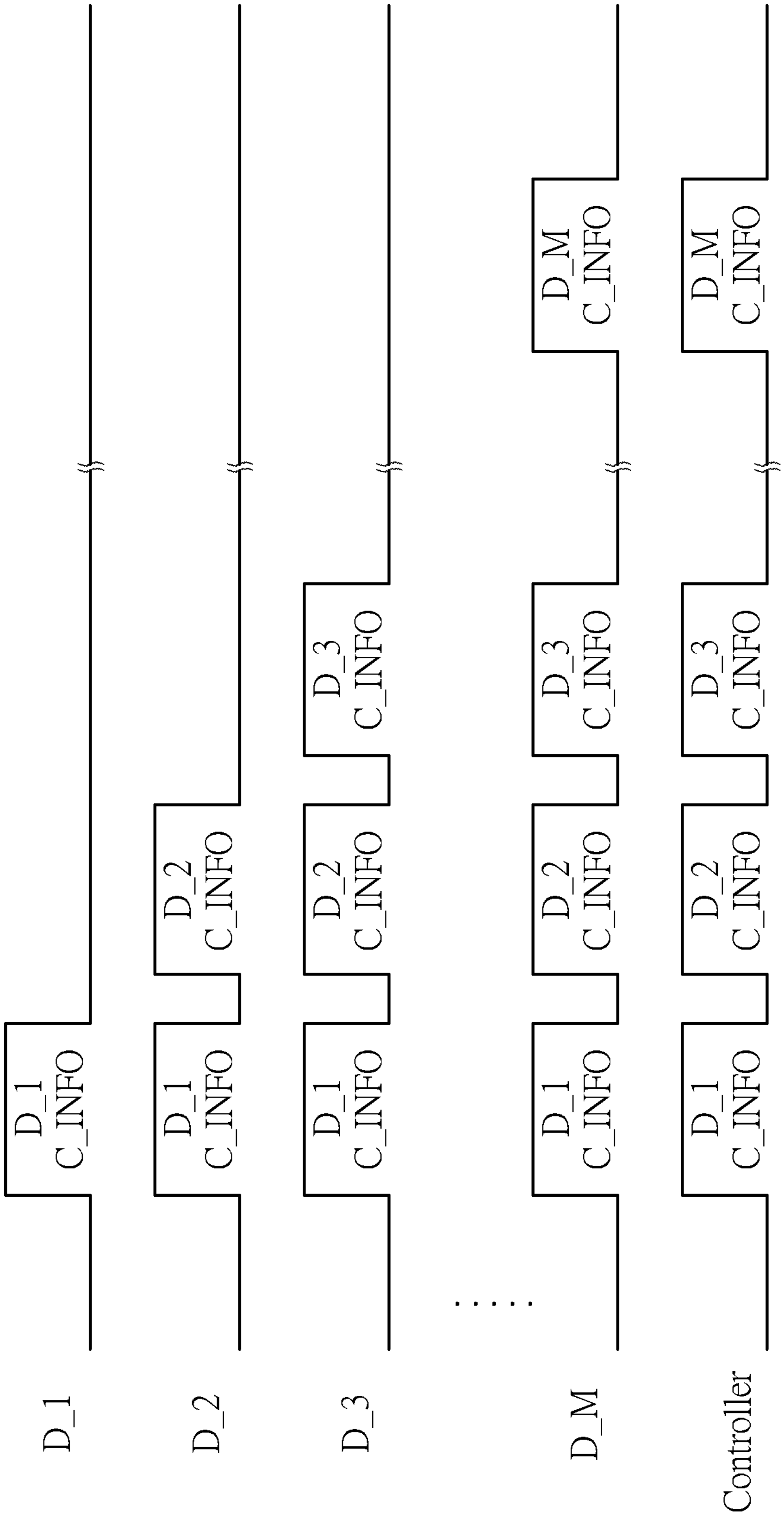
FIG. 5 illustrates the display driver circuits send the compensation information to the main controller time-divisionally.

In another embodiment, the compensation information of each display driver circuit D_1-D_M may be sent to the main controller time-divisionally, as shown in FIG. 5. For example, the main controller may broadcast a command to the display driver circuits D_1-D_M to instruct the display driver circuits D_1-D_M to return the related status or information. In response, the display driver circuits D_1-D_M may transmit the compensation information C_INFO through the transmission channels CH2 time-divisionally. In such a situation, a time period of the transmission channels CH2 may be divided into multiple time slots, and each time slot is applied to deliver the compensation information C_INFO of a corresponding light board. The compensation information C_INFO of all the light boards may be received by the main controller under the appropriate timing allocation.

Figure 6:
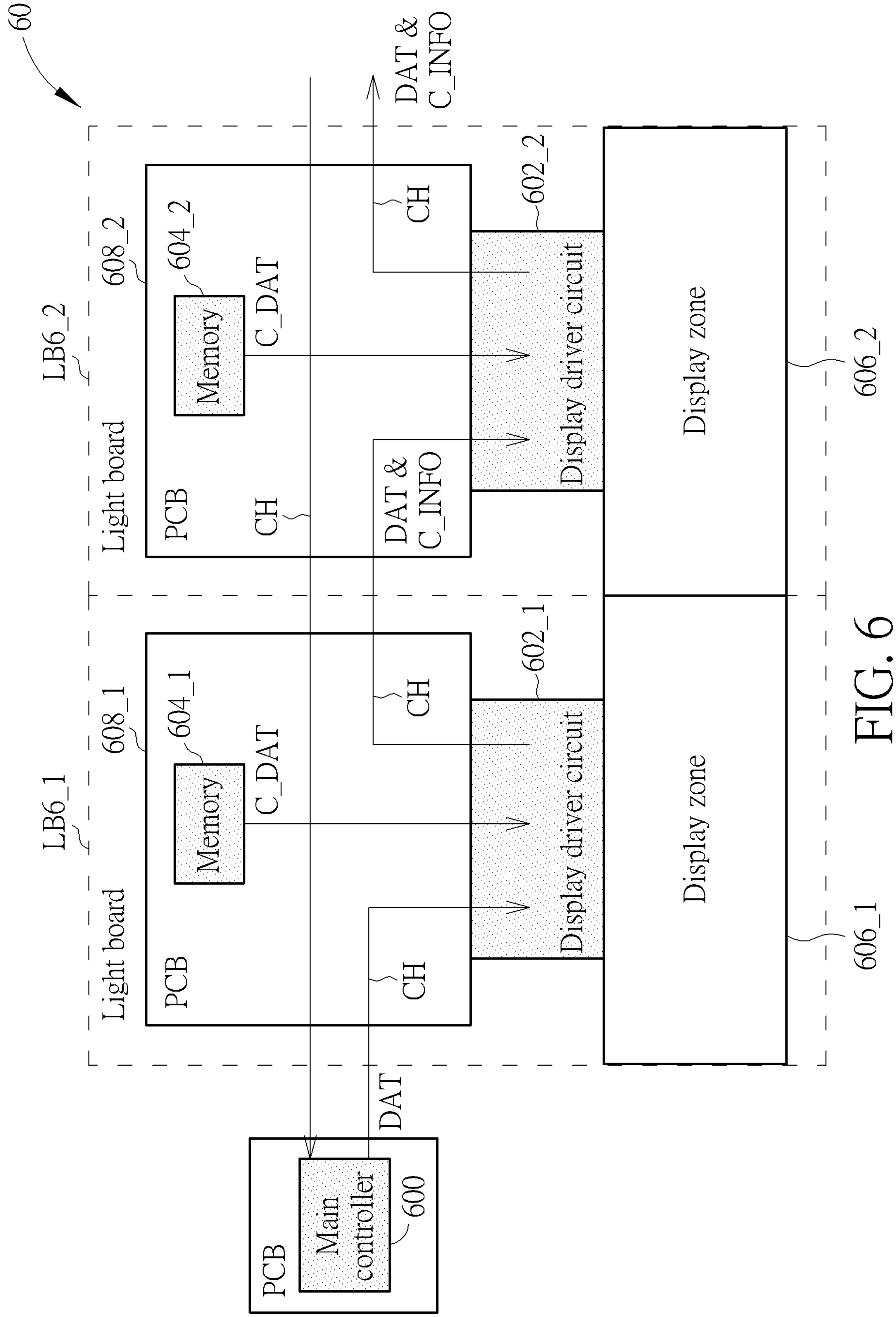
FIG. 6 is a schematic diagram of a display control system according to an embodiment of the present invention.

In another embodiment, in order to further save the circuit costs, the circuit structure of the light boards may further be simplified. For example, FIG. 6 is a schematic diagram of a display control system 60 according to an embodiment of the present invention, where the transmission channels CH1 and CH2 of the display control system 50 are integrated. As shown in FIG. 6, the display control system 60 includes a main controller 600 and a plurality of light boards LB6_1, LB6_2, where each light board LB6_1, LB6_2 may form a display zone 606_1, 606_2 and include a display driver circuit 602_1, 602_2 and a memory 604_1, 604_2, which are respectively implemented as a control circuit 608_1, 608_2 on a circuit board (e.g., PCB). The operations of the main controller 600, the display driver circuit 602_1, 602_2 and the memory 604_1, 604_2 are similar to those of the main controller 300, the display driver circuit 302_1, 302_2 and the memory 304_1, 304_2, and will not be detailed herein.

Different from the display control system 30 where every two adjacent display driver circuits (e.g., 302_1 and 302_2) are connected through two transmission channels CH1 and CH2, in the display control system 60, every two adjacent display driver circuits (e.g., 602_1 and 602_2) are connected through only one transmission channel CH. In such a situation, all of the display driver circuits included in the display control system 60 are cascaded through the transmission channels CH, where each transmission channel CH may be coupled between two display driver circuits (e.g., 602_1 and 602_2) or coupled between the display driver circuit 602_1 and the main controller 600. The transmission channels CH may forward the display data DAT from the main controller 600 to the corresponding display driver circuit 602_1, 602_2, and also forward the compensation information C_INFO from the display driver circuit 602_1, 602_2 to the main controller 600.

Figure 7:
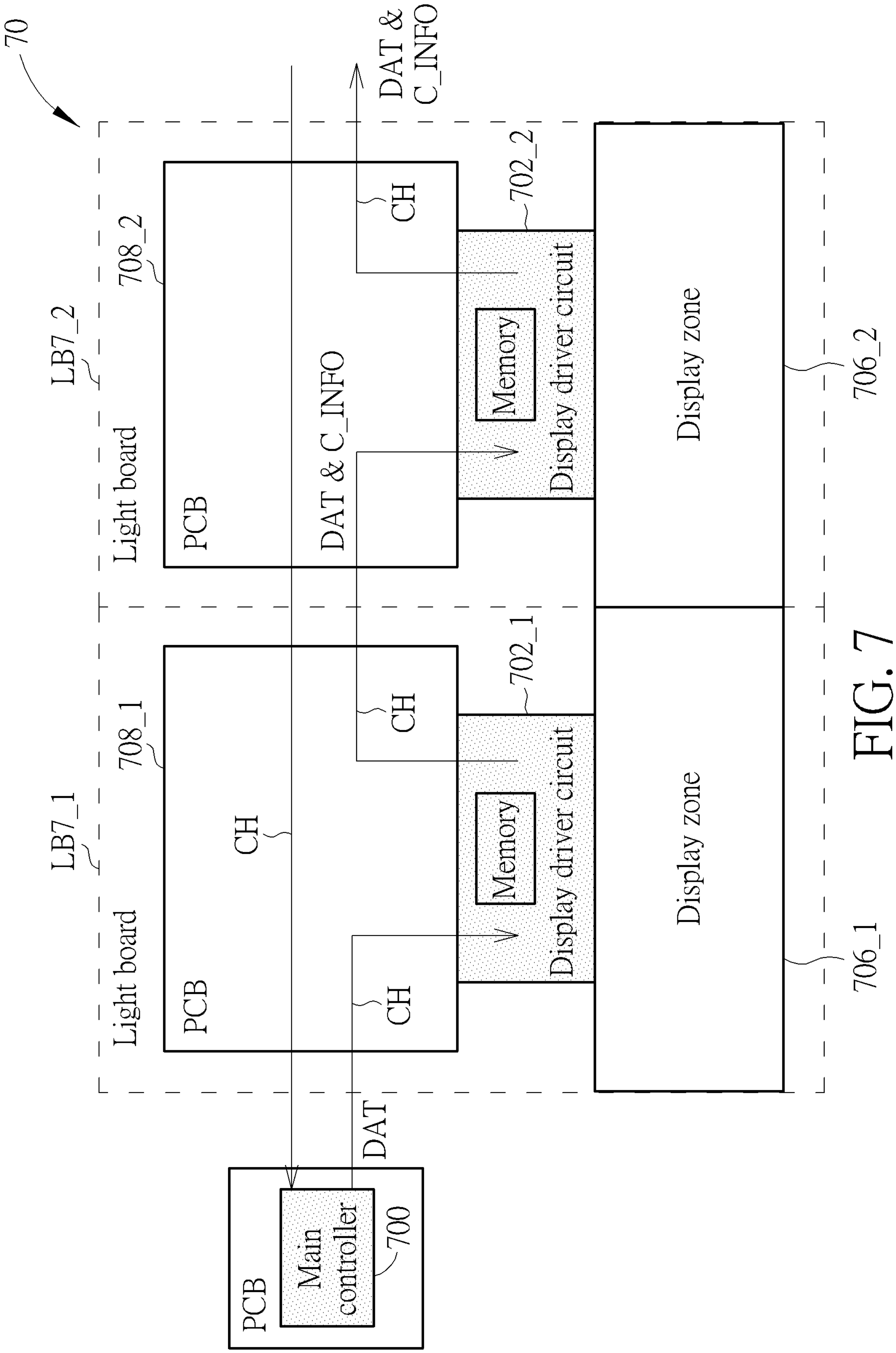
FIG. 7 is a schematic diagram of a display control system according to an embodiment of the present invention.

In another embodiment, the circuit structure of the light boards may further be simplified by integrating the display driver circuit with the memory. For example, FIG. 7 is a schematic diagram of a display control system 70 according to an embodiment of the present invention. The display control system 70 includes a main controller 700 and a plurality of light boards LB7_1, LB7_2, where each light board LB7_1, LB7_2 may form a display zone 706_1, 706_2 and include a display driver circuit 702_1, 702_2, which are respectively implemented as a control circuit 708_1, 708_2 on a circuit board (e.g., PCB). In this embodiment, the memory for storing the compensation data C_DAT for the LEDs on the corresponding display zone 706_1, 706_2 is embedded in the display driver circuit 702_1, 702_2.

In such a situation, each light board LB7_1 and LB7_2 may include only one IC, i.e., the display driver circuit 702_1, 702_2, and thus the wire connections between the display driver circuit and the memory may be omitted. Correspondingly, the number of layers on the PCB may also be saved, which leads to simplified layout implementation and lower costs.

In the embodiments of the present invention, the transmission channels (e.g., the transmission channels CH1 or CH2 of the display control system 20/30, or the transmission channels CH of the display control system 60/70) may apply the point-to-point high speed interface (PHI) for transmission. The PHI may achieve the benefits of high speed, low power consumption, and no clock/data skew. The BCLC/BCLD (bidirectional command link clock and bidirectional command link data) interfaces of the PHI may send the compensation information C_INFO through time-division multiplexing (TDM). In addition, the PHI may forward clock-embedded data by using the half run length coding (HRLC), so as to achieve low electromagnetic interference (EMI).

Figure 8:
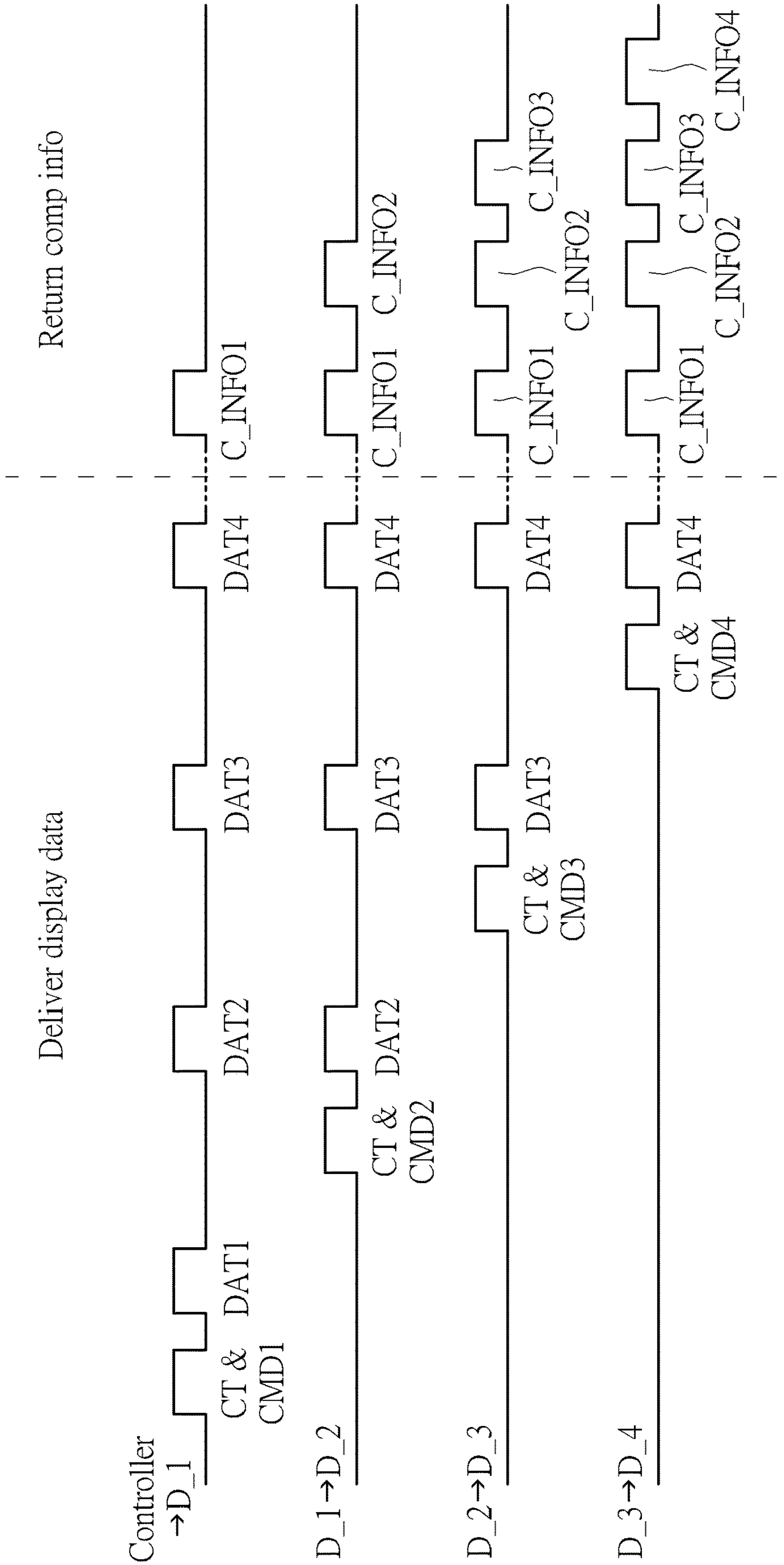
FIG. 8 is a timing diagram of the PHI implemented in the transmission channel of the display control system.

FIG. 8 is a timing diagram of the PHI implemented in the transmission channel CH of the display control system 60 or 70. The transmission channel CH may deliver both the display data and the compensation information, and thus an appropriate timing allocation is necessary. In this embodiment, the main controller and the display driver circuits in the light boards are connected in cascade, where the main controller is connected to the first display driver circuit D_1 (i.e., the display driver circuit in the first light board), the first display driver circuit D_1 is further connected to the second display driver circuit D_2 (i.e., the display driver circuit in the second light board), the second display driver circuit D_2 is further connected to the third display driver circuit D_3 (i.e., the display driver circuit in the third light board), and so on.

Based on the PHI, each display driver circuit is requested to perform clock training (CT) before receiving the display data from the front-end device. Since the display data carried by the PHI may be clock-embedded, the display driver circuit is requested to perform clock training to find the clock frequency, in order to recognize the correct data.

In this embodiment, the main controller may first output a first command CMD1 for the display driver circuit D_1, and the display driver circuit D_1 may perform clock training based on the first command CMD1. After the clock training is completed, the display driver circuit D_1 may be capable of data reception, and the main controller may send the display data DAT1 to be received by the display driver circuit D_1.

Subsequently, the main controller may output a second command CMD2 for the display driver circuit D_2 and send the second command CMD2 to the display driver circuit D_1. The display driver circuit D_1 forwards the second command CMD2 to the display driver circuit D_2. Based on the second command CMD2, the display driver circuit D_2 may perform clock training. After the clock training is completed, the display driver circuit D_2 may be capable of data reception, and the main controller may send the display data DAT2, which is forwarded through the display driver circuit D_1 and received by the display driver circuit D_2.

In the same manner, the main controller may sequentially output the commands CMD3, CMD4 . . . and the display data DAT3, DAT4 . . . for subsequent display driver circuits D_3, D_4 . . . , and the display driver circuits may perform clock training and then data reception.

Note that FIG. 8 illustrates the operations of the transmission channel CH of the display control system 60 or 70, where the display data and the compensation information are forwarded through the same transmission channel CH. Therefore, after the display data are transmitted, the transmission channel CH may be applied to forward the compensation information C_INFO1-C_INFO4, as shown in FIG. 8.

The compensation information for different display driver circuits may also be delivered time-divisionally. For example, the display driver circuit D_1 may first output the compensation information C_INFO1, which is forwarded through the display driver circuits D_2, D_3 . . . to the main controller. The display driver circuit D_2 may then output the compensation information C INFO2, which is forwarded through the display driver circuits D_3, D_4 . . . to the main controller. By the same token, the compensation information C_INFO1-C_INFO4 of all display driver circuits may be delivered through the transmission channel CH.

Please note that the present invention aims at providing a novel display control system for a splicing screen. Those skilled in the art may make modifications and alterations accordingly. For example, the above embodiments specify that the compensation information sent from the display driver circuits to the main controller includes demura information and/or abnormal information, but the present invention is not limited thereto. In another embodiment, the compensation information may include any other information required by the main controller. In addition, the display control system of the present invention is applicable to a splicing screen or any other screen, which may be of any type of display panel such as a LED panel, mini-LED panel, micro-LED panel, ultra-LED panel or OLED panel, but not limited thereto.

Figure 9:
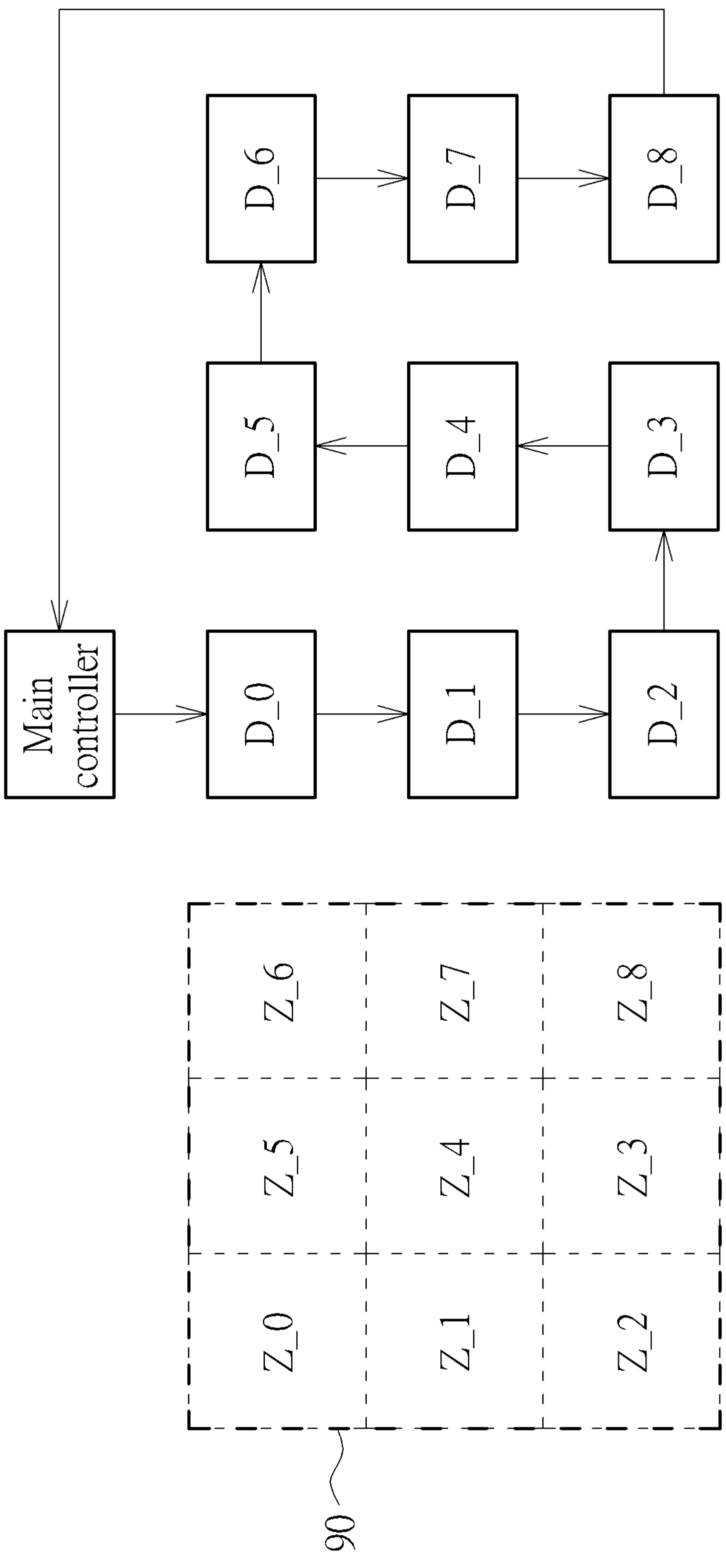
FIG. 9 illustrates the display driver circuits of the light boards are cascaded to form the splicing screen.

Further, the light boards for forming the splicing screen may be cascaded in any appropriate manner. For example, as shown in FIG. 9, a splicing screen 90 may be divided into 9 display zones Z_0-Z_8, which may be included in 9 light boards, respectively. Each of the light boards may include a display driver circuit, i.e., D_0-D_8. The display driver circuits D_0-D_8 are connected in cascade. The first display driver circuit D_0 and the last display driver circuit D_8 may further be coupled to the main controller.

Note that the structure shown in FIG. 9 is one of various implementations of the present invention. In another embodiment, the display driver circuits may be cascaded in other manners, and the related connections should not limit the scope of the present invention.

Figure 10:
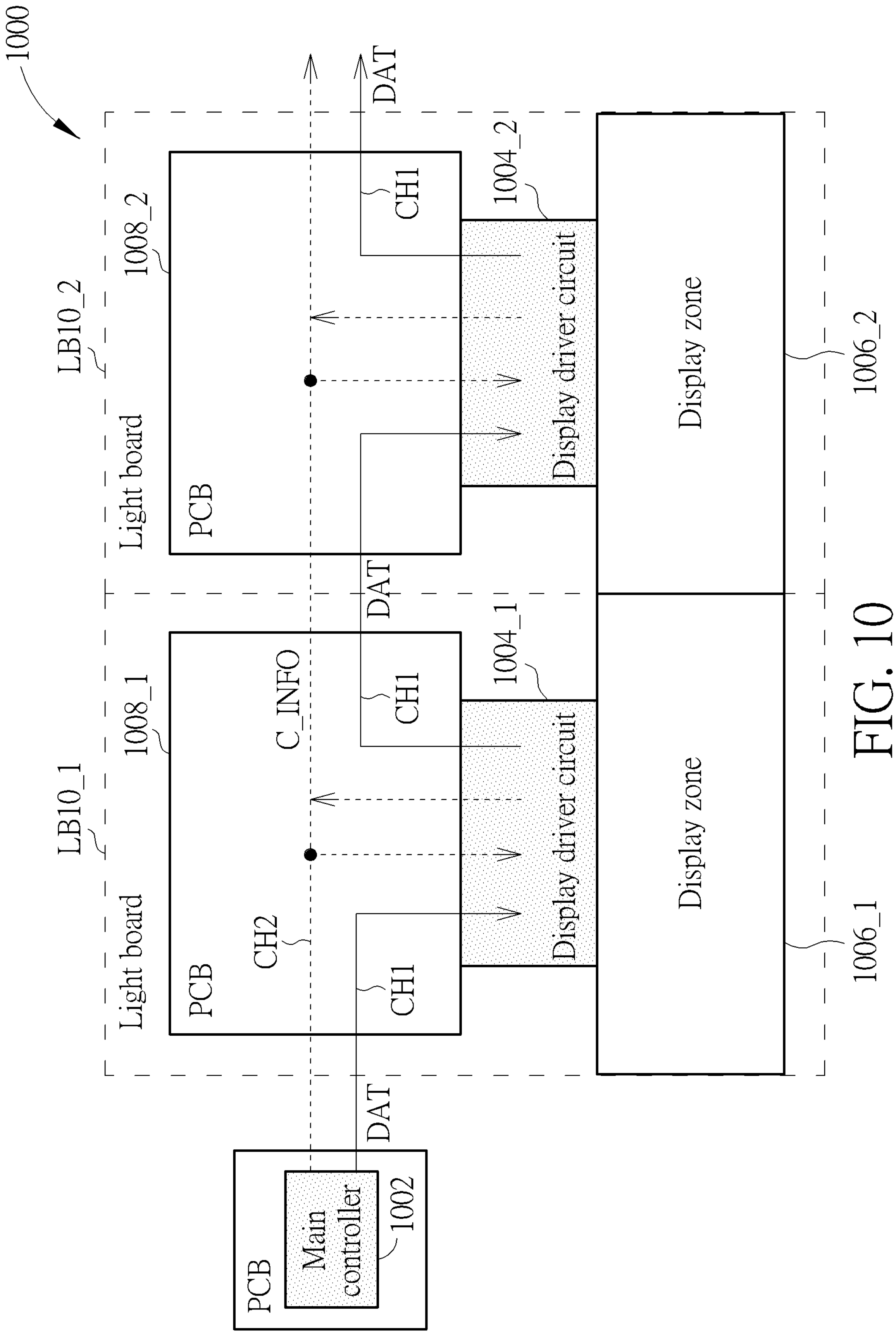
FIG. 10 is a schematic diagram of a display control system according to an embodiment of the present invention.

In addition, in the above embodiments, the PHI is applied to the cascaded transmission channels as in the display control system 60 or 70. In another embodiment, the PHI may be applicable to the multi-drop interface. For example, the transmission channel for delivering the compensation information may be implemented as the multi-drop interface. FIG. 10 is a schematic diagram of a display control system 1000 according to an embodiment of the present invention. The display control system 1000 includes a main controller 1002 and a plurality of light boards LB10_1, LB10_2, where each light board LB10_1, LB10_2 may form a display zone 1006_1, 1006_2 and include a display driver circuit 1004_1, 1004_2, which are respectively implemented as a control circuit 1008_1, 1008_2 on a circuit board (e.g., PCB).

The display driver circuits 1004_1 and 1004_2 of different light boards LB10_1 and LB10_2 are connected through transmission channels CH1 and CH2. The transmission channels CH1 may cascade the display driver circuits, where each transmission channel CH1 may be coupled between two display driver circuits (e.g., 1004_1 and 1004_2) or coupled between the display driver circuit 1004_1 and the main controller 1002. The transmission channels CH1 may forward the display data DAT from the main controller 1002 to the display driver circuits 1004_1 and 1004_2. In this embodiment, the transmission channel CH1 may be the main channel of the PHI interface.

In addition, the transmission channel CH2, which delivers the compensation information C_INFO from the display driver circuits 1004_1 and 1004_2 to the main controller 1002, may be implemented as the BCLC/BCLD interface of the PHI. In this embodiment, the transmission channel CH2 applies a multi-drop interface, where a transmission bus is connected to the main controller 1002 and the display driver circuits 1004_1 and 1004_2 of all the light boards.

To sum up, the present invention provides a novel display control system for a splicing screen. The display control system may include a main controller and a plurality of light boards. Each of the light boards has a display zone for constructing the splicing screen. In an embodiment, a light board may include a sub-controller, a memory and multiple display driver circuits. The sub-controllers of different light boards may be connected in cascade. Each sub-controller may output display data to the display driver circuits, and the display driver circuits returns compensation information to the sub-controller. The sub-controller then sends the compensation information to the main controller.

In another embodiment, a light board may include a memory and only one display driver circuit, where the sub-controller is omitted. The display driver circuit may realize the functions of the sub-controller and multiple display driver circuits in the previous embodiment, to achieve lower costs with a simplified circuit structure. The display driver circuits of different light boards may be connected in cascade. The display driver circuits may be cascaded through two channels, where one channel may forward the display data and the other may forward the compensation information. In order to further simplify the wire connections, the display driver circuits may be cascaded through one channel, which may forward both the display data and the compensation information.

In a further embodiment, the memory may be integrated into the display driver circuit, in order to further reduce the number of ICs in the display control system and simplify the wire connections. Since a splicing screen may include a great number of light boards, the simplified structure of the light boards will significantly reduce the overall costs of the splicing screen.

In the embodiments of the present invention, the PHI may be applied for transmission, in order to achieve the benefits of high speed, low power consumption, no clock/data skew, and low EMI.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display control system for controlling a display panel, the display panel having a plurality of display zones, the display control system comprising:

a main controller;

a plurality of display driver circuits, each coupled to a corresponding display zone among the plurality of display zones, to control the corresponding display zone; and a plurality of memories, each coupled to a corresponding display driver circuit among the plurality of display driver circuits, to store a compensation data for the corresponding display zone controlled by the corresponding display driver circuit;

wherein the plurality of display driver circuits are cascaded through a plurality of first transmission channels and connected through at least one second transmission channel, and each of the plurality of first transmission channels is coupled between two of the plurality of display driver circuits or between one of the plurality of display driver circuits and the main controller.

2. The display control system of claim 1, wherein the main controller transmits a display data to a first display driver circuit among the plurality of display driver circuits without through a sub-controller.

3. The display control system of claim 1, wherein the plurality of first transmission channels forward a display data from the main controller to a first display driver circuit among the plurality of display driver circuits, and the at least one second transmission channel forwards compensation information from a second display driver circuit among the plurality of display driver circuits to the main controller.

4. The display control system of claim 3, wherein the compensation information comprises at least one of demura information and abnormal information of a display zone among the plurality of display zones corresponding to the second display driver circuit.

5. The display control system of claim 1, wherein at least one of the plurality of first transmission channels and the at least one second transmission channel comprises a point-to-point high speed interface (PHI).

6. The display control system of claim 1, wherein the compensation data stored in a first memory among the plurality of memories comprises a demura data for a display zone among the plurality of display zones corresponding to the first memory.

7. The display control system of claim 1, wherein a first memory among the plurality of memories is embedded in the corresponding display driver circuit.

8. The display control system of claim 1, wherein each of the at least one second transmission channel is coupled between two of the plurality of display driver circuits to cascade the plurality of display driver circuits.

9. The display control system of claim 1, wherein the at least one second transmission channel comprises a multi-drop interface.

10. A display control system for controlling a display panel, the display panel having a plurality of display zones, the display control system comprising:

a main controller;

a plurality of sub-controllers, coupled to the main controller, each to control a corresponding display zone among the plurality of display zones;

a plurality of display driver circuits, each coupled to one of the plurality of sub-controllers and one of the plurality of display zones controlled by the corresponding sub-controller; and a plurality of memories, each coupled to a corresponding sub-controller among the plurality of sub-controllers, to store a compensation data for one of the plurality of display zones controlled by the corresponding sub-controller;

wherein the plurality of sub-controllers are cascaded through a plurality of first transmission channels;

wherein a first sub-controller among the plurality of sub-controllers is coupled to a plurality of first display driver circuits among the plurality of display driver circuits through a second transmission channel and a third transmission channel.

11. The display control system of claim 10, wherein the second transmission channel forwards a display data from the first sub-controller to one of the plurality of first display driver circuits, and the third transmission channel forwards compensation information from one of the plurality of first display driver circuits to the first sub-controller.

12. The display control system of claim 11, wherein the compensation information comprises at least one of demura information and abnormal information of a display zone among the plurality of display zones corresponding to the first sub-controller.

13. The display control system of claim 11, wherein the third transmission channel for forwarding the compensation information comprises a multi-drop interface.

14. The display control system of claim 10, wherein each of the second transmission channel and the third transmission channel comprises a point-to-point high speed interface (PHI).

15. The display control system of claim 10, wherein the compensation data stored in a first memory among the plurality of memories comprises a demura data for a display zone among the plurality of display zones corresponding to the first memory.

16. A display control system for controlling a display panel, the display panel having a plurality of display zones, the display control system comprising:

a main controller;

a plurality of display driver circuits, each coupled to a corresponding display zone among the plurality of display zones, to control the corresponding display zone; and a plurality of memories, each coupled to a corresponding display driver circuit among the plurality of display driver circuits, to store a compensation data for the corresponding display zone controlled by the corresponding display driver circuit;

wherein the plurality of display driver circuits are cascaded through a plurality of transmission channels, and each of the plurality of transmission channels is coupled between two of the plurality of display driver circuits or between one of the plurality of display driver circuits and the main controller.

17. The display control system of claim 16, wherein the main controller transmits a display data to a first display driver circuit among the plurality of display driver circuits without through a sub-controller.

18. The display control system of claim 16, wherein the plurality of transmission channels forward a display data from the main controller to a first display driver circuit among the plurality of display driver circuits, and also forward compensation information from a second display driver circuit among the plurality of display driver circuits to the main controller.

19. The display control system of claim 18, wherein the compensation information comprises at least one of demura information and abnormal information of a display zone among the plurality of display zones corresponding to the second display driver circuit.

20. The display control system of claim 16, wherein each of the plurality of transmission channels comprises a point-to-point high speed interface (PHI).

21. The display control system of claim 16, wherein the compensation data stored in a first memory among the plurality of memories comprises a demura data for a display zone among the plurality of display zones corresponding to the first memory.

22. The display control system of claim 16, wherein a first memory among the plurality of memories is embedded in the corresponding display driver circuit.

* * * * *